United States Patent
Park et al.

(10) Patent No.: US 7,875,154 B2
(45) Date of Patent: Jan. 25, 2011

(54) PREPARATION METHOD OF PALLADIUM ALLOY COMPOSITE MEMBRANE FOR HYDROGEN SEPARATION

(75) Inventors: Jong-Soo Park, Daejeon (KR); Wang-Lai Yoon, Daejeon (KR); Ho-Tae Lee, Daejeon (KR); Heon Jung, Daejeon (KR); Dong-Won Kim, Daejeon (KR); Seong-Ho Cho, Daejeon (KR); Shin-Kun Lee, Daejeon (KR); Jung-Won Park, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 101 days.

(21) Appl. No.: 11/662,432

(22) PCT Filed: Sep. 15, 2005

(86) PCT No.: PCT/KR2005/003078

§ 371 (c)(1), (2), (4) Date: Aug. 30, 2007

(87) PCT Pub. No.: WO2006/031080

PCT Pub. Date: Mar. 23, 2006

(65) Prior Publication Data

US 2008/0116078 A1 May 22, 2008

(30) Foreign Application Priority Data

Sep. 15, 2004 (KR) .................. 10-2004-0073902

(51) Int. Cl.
*C23C 14/00* (2006.01)

(52) U.S. Cl. .................. 204/192.1
(58) Field of Classification Search .............. 427/375, 427/376.8, 383.3, 383.7; 205/228; 204/192.1
See application file for complete search history.

(56) References Cited

U.S. PATENT DOCUMENTS 4,372,806 A * 2/1983 Vossen, Jr. .................. 438/720
5,798,148 A * 8/1998 Thomas et al. .............. 427/535

(Continued)

FOREIGN PATENT DOCUMENTS

JP 56069369 A * 6/1981

(Continued)

OTHER PUBLICATIONS

Hoang et al., "Fabrication and Characterization of Dual Sputtered Pd-Cu Alloy Films for Hydrogen Separation Membranes", Materials Letters (Jan. 2004), vol. 58, Issues 3-4, pp. 525-528.*

(Continued)

Primary Examiner—Edna Wong
(74) Attorney, Agent, or Firm—Greer, Burns & Crain, Ltd.

(57) ABSTRACT

Disclosed herein is a method of preparing a palladium alloy composite membrane for hydrogen separation, including (a) providing a first metal coating layer on a porous support using a dry sputtering deposition process; (b) providing a palladium coating layer on the first metal coating layer using a dry sputtering deposition process; and (c) heat treating the palladium coating layer to form an alloy layer of palladium and the first metal.

6 Claims, 6 Drawing Sheets

(a)

(b)

U.S. PATENT DOCUMENTS

| | | | |
|---|---|---|---|
| 6,787,446 B2 * | 9/2004 | Enomoto et al. | 438/623 |
| 7,112,287 B2 * | 9/2006 | Yagi et al. | 216/56 |
| 7,169,704 B2 * | 1/2007 | Koo et al. | 438/677 |
| 2003/0190486 A1 * | 10/2003 | Roa et al. | 428/469 |

FOREIGN PATENT DOCUMENTS

| | | | | |
|---|---|---|---|---|
| JP | 01052095 A | * | 2/1989 | |
| JP | 04326931 A | * | 11/1992 | |
| JP | 05123548 A | * | 5/1993 | |
| WO | WO 2004011130 A1 | * | 2/2004 | |

OTHER PUBLICATIONS

Roa et al.; "Preparation and characterization of Pd-Cu composite membranes for hydrogen separation"; Chemical Engineering Journal 93; pp. 11-22; 2003.

Lee et al.; "Preparation and characterization of $SiO_2$ composite membrane for purification of hydrogen from methanol steam reforming as an energy carrier system for PEMFC"; Separation and Purification Technology 32; pp. 45-50; 2003.

Gielens et al.; "High-flux palladium-silver alloy membranes fabricated by microsystem technology;" Desalination 147 (2002) pp. 417-423.

Kim et al.; "A Pd-Cu-Ni Ternary Alloyed Membrane on Porous Nickel Support Prepared by Sputtering and Copper Reflow;" Japanese Journal of Applied Physics; vol. 44, No. 7; pp. L233-L234; 2005.

* cited by examiner

[Fig.1] PRIOR ART
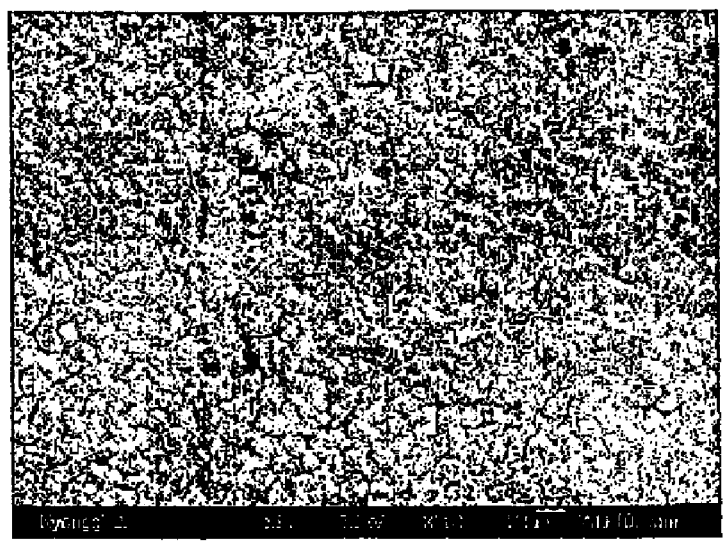
[Fig.2]
(a)
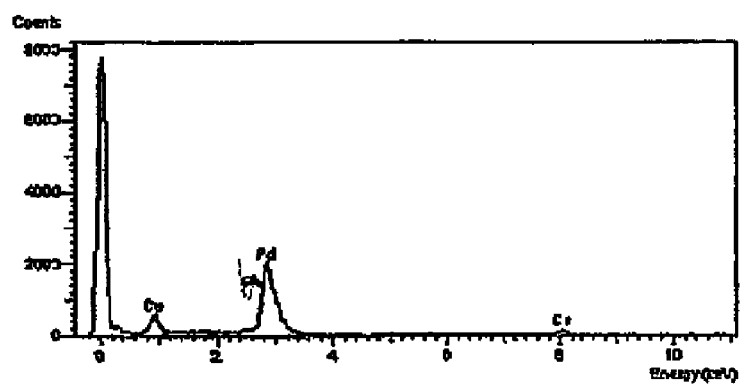
(b)

[Fig.3]
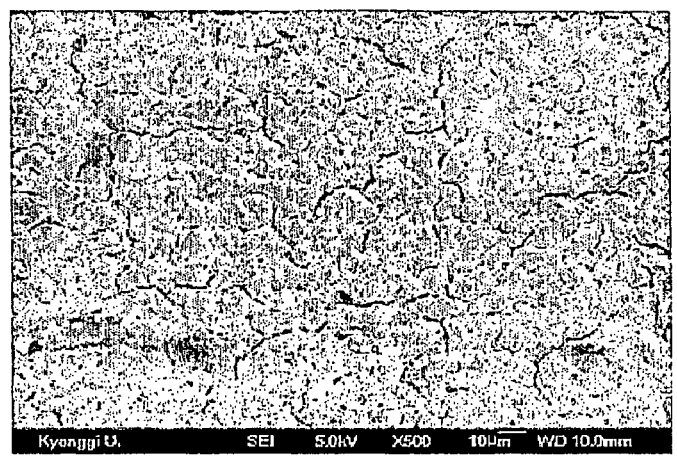
(a)
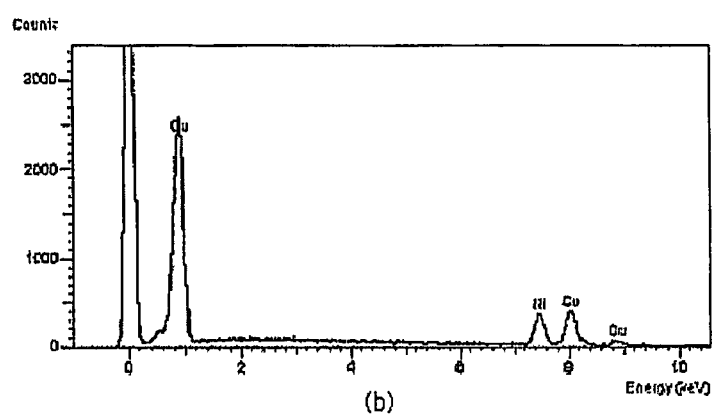
(b)
[Fig.4]
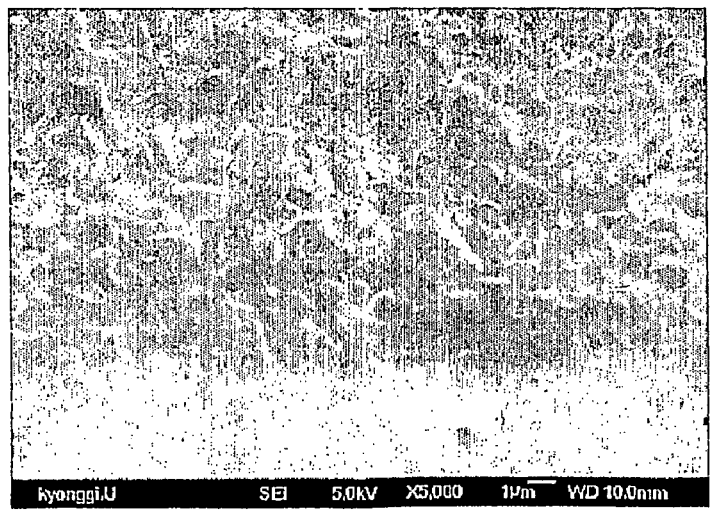

[Fig.5]
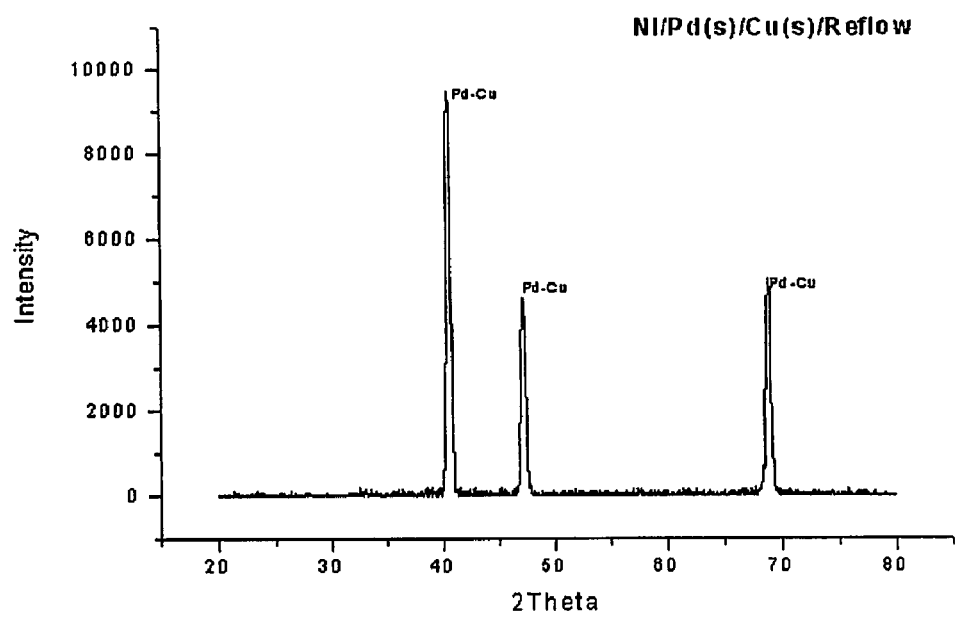
[Fig.6]
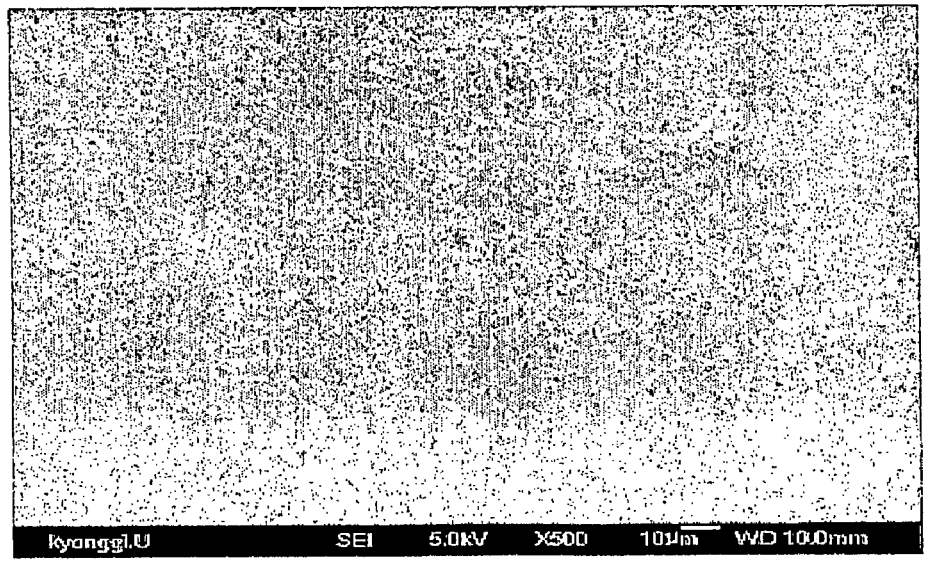

[Fig.7]
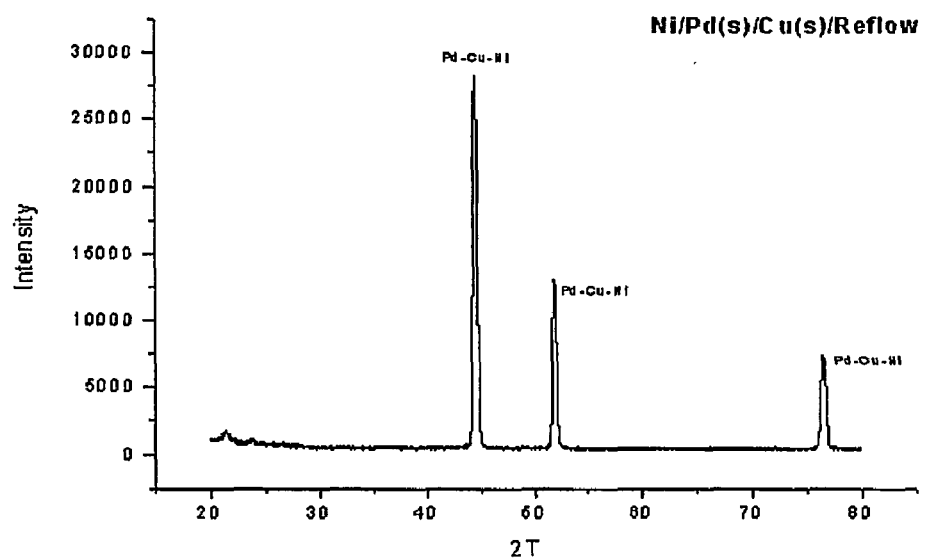
[Fig.8]
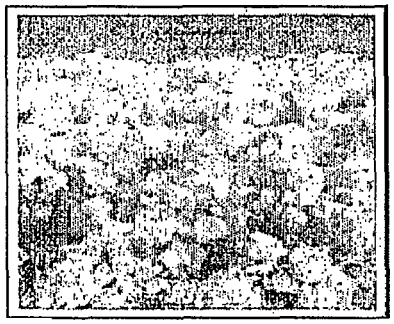
[Fig.9]
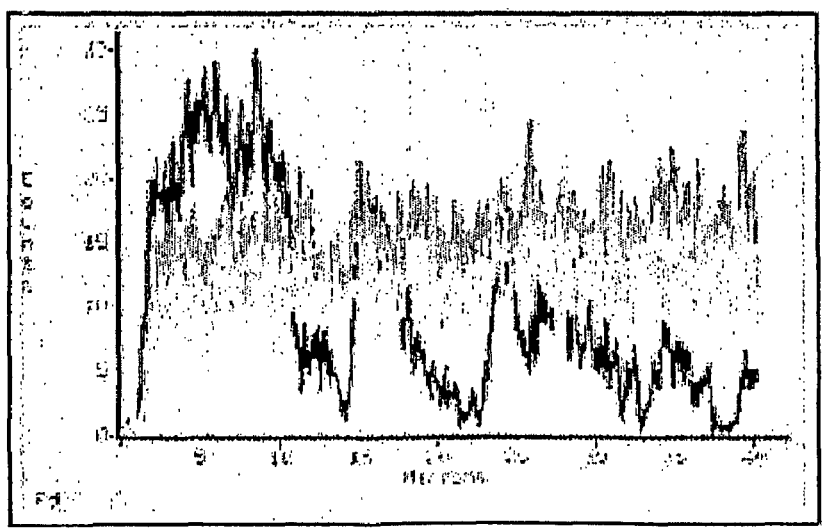

[Fig.10]
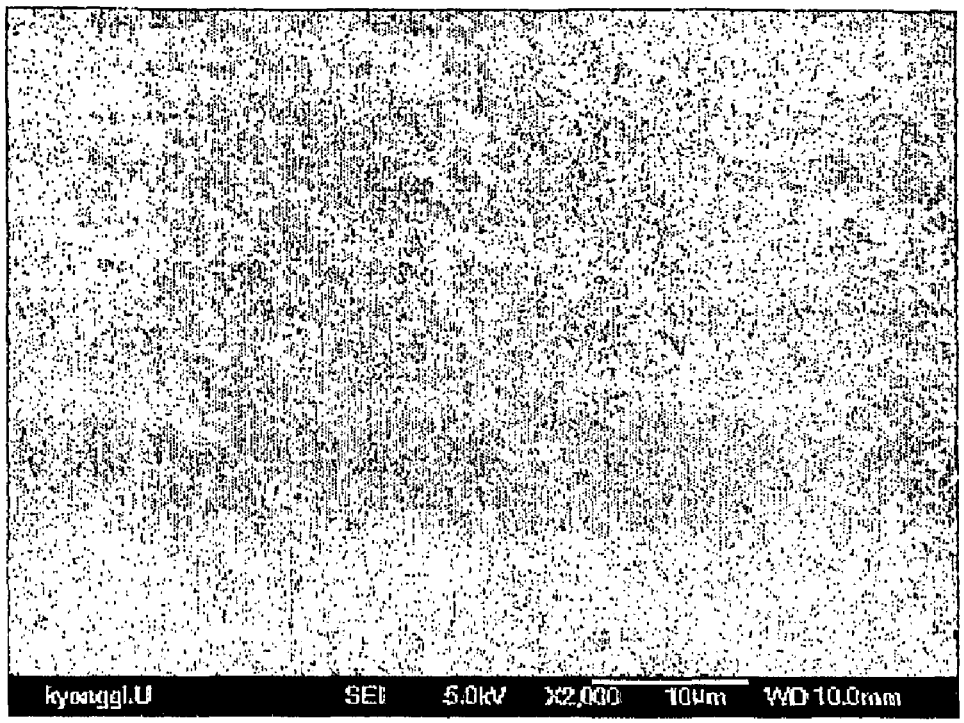
[Fig.11]
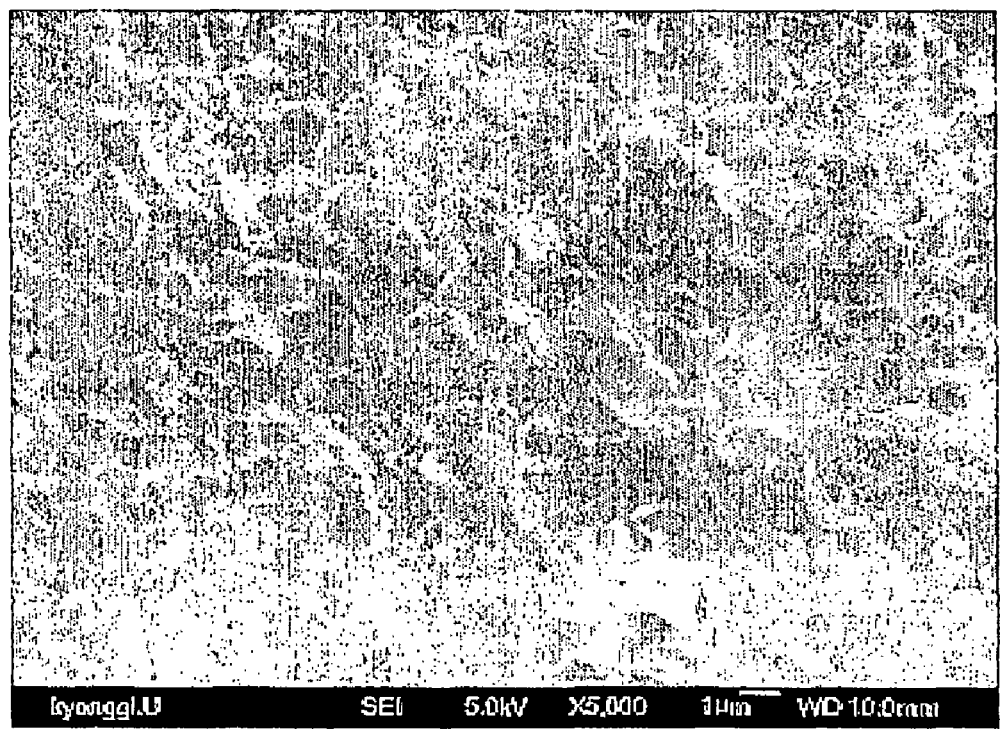

PREPARATION METHOD OF PALLADIUM ALLOY COMPOSITE MEMBRANE FOR HYDROGEN SEPARATION

TECHNICAL FIELD

The present invention relates, generally, to a method of preparing a palladium alloy composite membrane for hydrogen separation, and, more particularly, to a method of preparing a palladium alloy composite membrane for hydrogen separation, which is advantageous because palladium is used in a small amount, and thus a membrane for hydrogen separation having outstanding selectivity to hydrogen gas and high durability can be prepared, and, as well, the properties of the separation membrane can be improved, regardless of the kind of support.

BACKGROUND ART

Generally, a separation membrane used for the preparation of ultra highly pure hydrogen has low permeability. Hence, in order to overcome such a problem, intensive and extensive research on improvement of the selective permeability of the membrane by applying a non-porous palladium membrane on a porous support is presently being studied. The non-porous palladium membrane has high hydrogen selectivity but has low permeability. Therefore, although the selective hydrogen permeability of the separation membrane is intended to increase by coating the surface of the porous support with a thin palladium membrane, the separation membrane coated with only palladium suffers because it may be deformed due to phase change of the lattice structure while hydrogen gas is absorbed. With the goal of preventing such deformation, a palladium alloy separation membrane is mainly used at present.

A metal, which is alloyed with palladium, includes, for example, silver, nickel, copper, ruthenium, molybdenum, etc. In particular, a palladium-copper alloy membrane, which is prepared using inexpensive copper, has resistance to hydrogen sulfide and sulfur compound poisoning superior to other palladium alloy membranes, and thus has been thoroughly studied in recent years. In such cases, the alloy membrane is typically prepared by alloying a copper plating layer and a plated palladium layer (or a sputtered palladium layer) sequentially coated on a porous ceramic support or a porous metal support. However, the palladium-copper alloy membrane prepared using such a conventional method is disadvantageous because it is not dense and has fine pores or defects therein, thus having low hydrogen selectivity (FIG. 1). Further, when the copper layer, serving as an alloy source, is present as an intermediate layer between the support and the palladium layer, it may be separated due to the thermal diffusion and fluid reflow properties at a usage temperature of 500° C., therefore negatively affecting the adhesion. Consequently, the palladium-copper alloy separation membrane breaks.

Turning now to FIG. 2, there is illustrated a palladium-copper alloy membrane, which comprises a palladium-copper alloy coating layer provided on a porous metal support by sequentially forming a nickel plating layer as an underlayer of a copper plating layer, a copper plating layer and a palladium plating layer on the porous metal support and then heat treating them. In addition, this drawing shows the result of heat treatment for the alloy membrane at a usage temperature of 500° C. for 100 hr.

From the surface microstructure of the separated upper portion of the alloy membrane and the EDS result shown in FIG. 2, it can be seen that the microstructure of membrane is not dense and copper and palladium are present in this portion. FIG. 3 illustrates the surface microstructure of the separated lower portion of the alloy membrane and the EDS result, in which the microstructure of membrane is not dense and copper and nickel are present in this portion. Thereby, it appears that the copper plating layer is separated through the thermal diffusion of copper atoms and moved to the upper layer (palladium coating layer) and the lower layer (support) of the copper plating layer.

Recently, a palladium alloy composite separation membrane has been developed using a porous metal support made of stainless steel through an electroplating process. However, since the pore size of the porous stainless steel support used is large and the surface thereof is rough, a complicated pretreatment procedure is required to apply the palladium alloy separation membrane. In the case where the electroplating process is conducted on the porous stainless steel support to form a palladium alloy coating layer, the support may be corroded by hydrochloric acid acting as a main component for activation of a plating process, and hydrogen separation properties may decrease due to additive impurities in a plating solution. In addition, the palladium metal is diffused into the support at a usage temperature of 500° C., thus decreasing durability. As well, upon reforming of hydrogen gas, hydrogen brittleness of a stainless steel substrate is caused by the hydrogen absorption, and thus the substrate may break.

DISCLOSURE

Technical Problem

Accordingly, the present invention has been made to overcome the above problems occurring in the related art, and an object of the present invention is to provide a method of preparing a palladium alloy composite membrane for hydrogen separation, which is advantageous because a small amount of palladium is used, thus a membrane for hydrogen separation having excellent hydrogen selectivity and high durability can be prepared, and as well, the properties of the separation membrane can be improved, regardless of the kind of support.

Technical Solution

According to a first embodiment of the present invention for achieving the above object, a method of preparing a palladium alloy composite membrane for hydrogen separation is provided, comprising (a) forming a palladium coating layer on a porous support; (b) forming a metal coating layer on the palladium coating layer; and (c) subjecting the metal coating layer to a reflow process to form an alloy layer with a void free and dense film.

According to a second embodiment of the present invention, a method of preparing a palladium alloy composite membrane for hydrogen separation is provided, comprising (a) forming a first metal coating layer on a porous support using an electroplating process; (b) forming a palladium coating layer on the first metal coating layer; (c) forming a second metal coating layer on the palladium coating layer; and (d) subjecting the second metal coating layer to a reflow process to form an alloy layer with a void free and dense film.

In the method of the present invention, the porous support is preferably a porous metal support or a porous ceramic support.

In the method of the present invention, the porous support is preferably a porous nickel support.

In the method according to the second embodiment of the present invention, (a) preferably further comprises heat treating the first metal coating layer formed using the electroplating process to remove impurities.

In the method according to the second embodiment of the present invention, the first metal coating layer is preferably formed of at least one metal selected from the group consisting of nickel, copper, and silver.

In the method according to the first embodiment of the present invention, the first metal coating layer is formed of nickel.

In the method according to the second embodiment of the present invention, the second metal coating layer is formed of copper.

Advantageous Effects

The present invention provides a method of preparing a palladium alloy composite membrane for hydrogen separation. According to the method of the present invention, even though palladium is used in a small amount, the separation membrane having excellent hydrogen selectivity and high durability can be prepared. Further, the properties of the hydrogen separation membrane can be improved, regardless of the kind of support.

DESCRIPTION OF DRAWINGS

FIG. 1 is a scanning electron micrograph showing the microstructure of a palladium-copper alloy composite membrane prepared using a conventional method;

FIG. 2 is a scanning electron micrograph showing the microstructure of the separated upper portion of the alloy composite membrane, in which a palladium-copper alloy coating layer is provided on a porous metal support through heat treatment in order to assay the durability of the membrane, and showing the result of EDS analysis thereof;

FIG. 3 is a scanning electron micrograph showing the microstructure of the separated lower portion of the alloy composite membrane, and showing the result of EDS analysis thereof;

FIG. 4 is a scanning electron micrograph showing the microstructure of a palladium-copper alloy composite membrane prepared through simple reflow heat treatment of a copper layer, according to the present invention;

FIG. 5 shows the result of XRD analysis for the palladium-copper alloy composite membrane of the present invention;

FIG. 6 is a scanning electron micrograph showing the surface microstructure of the alloy composite membrane, in which a nickel coating layer, a sputtered palladium coating layer and a sputtered copper coating layer are sequentially formed on a porous nickel support and then heat treated at 600% higher than an actual usage temperature for 20 days in a nitrogen atmosphere, in order to observe thermal stability;

FIG. 7 shows the result of crystal structure analysis of the palladium-copper-nickel alloy composite membrane of the present invention;

FIG. 8 is a scanning electron micrograph showing the cross section of an alloy composite membrane sample of the present invention;

FIG. 9 is an EDS line scan showing the cross section of the alloy composite membrane sample of the present invention;

FIG. 10 is a scanning electron micrograph showing the surface microstructure of a palladium-copper alloy composite membrane, resulting from reflow heat treatment of a palladium coating layer and a copper coating layer, each of which is formed using an electroplating process, according to the present invention;

FIG. 11 is a scanning electron micrograph showing the surface microstructure of a palladium-copper alloy composite membrane formed on a porous alumina support using a reflow process, according to the present invention.

BEST MODE

Figure 12:
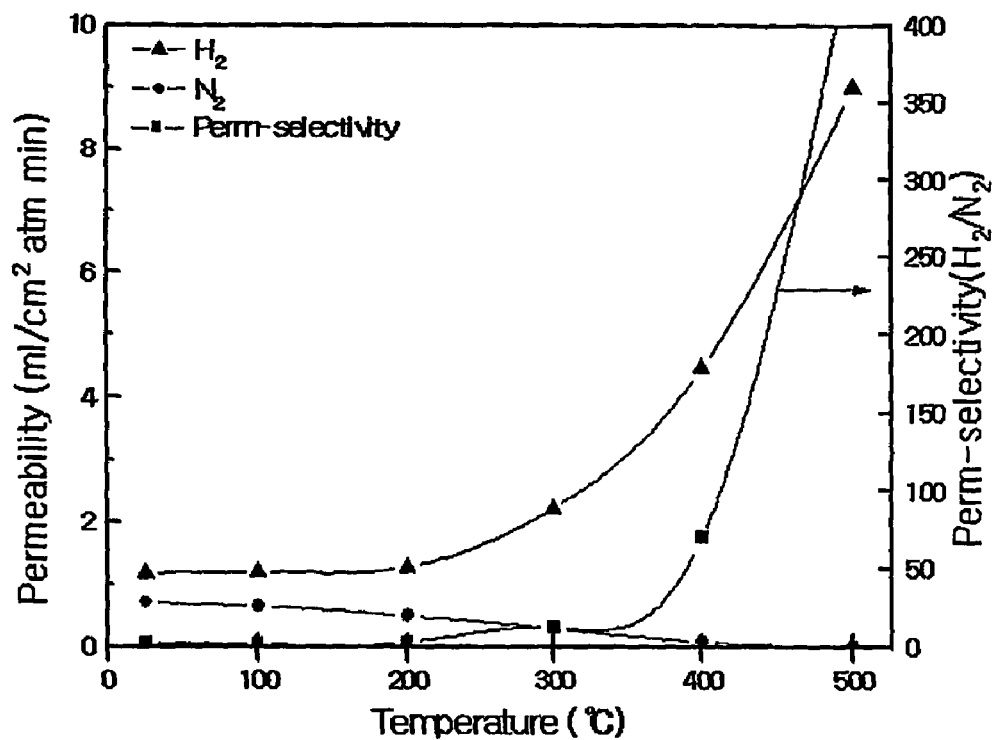
FIG. 12 shows the hydrogen/nitrogen separation of the palladium-copper alloy composite membrane formed on a porous nickel support using a copper reflow process, upon use of a gas mixture including hydrogen and nitrogen, according to the present invention.

Hereinafter, a detailed description will be given of a method of preparing a palladium alloy composite membrane for hydrogen separation, according to a first embodiment of the present invention.

Based on the present invention, as the support for the composite membrane, a porous metal support or a porous ceramic support may be used. The porous support may be a planar type or a tubular type. Compared to porous ceramic supports, the porous metal support is advantageous because it entails a lower preparation cost, higher thermal impact resistance and mechanical strength, and higher processability and modularity, and is thus suitable for application in highly pure hydrogen separation and purification systems or catalyst reactors.

In particular, a porous nickel support has good chemical affinity to palladium and nickel, which are main components of the palladium alloy composite membrane. Further, compared to porous stainless steel metal supports, the porous nickel support does not generate hydrogen brittleness due to intrinsic properties thereof, and has higher resistance to corrosion by hydrochloric acid. The porous nickel support resulting from sintering of nickel powder has an average pore size of sub-μm or less than, and the pore density thereof is uniform, thus no complicated pretreatment is required when coated with a palladium alloy composite membrane. In addition, the porous nickel support itself has hydrogen selectivity of about 8~10 and permeability of 150 ml/cm$^2$·atm·min or more and thereby has properties suitable for use in the metal support of a palladium alloy composite membrane.

A palladium coating layer, which is applied on the porous support, may be formed using either a wet electroplating process or a dry sputtering deposition process. Preferably, an electroplating process is adopted, so that the surface pores of the porous support are completely filled and the surface flatness thereof is attained. In this case, with the aim of improving adhesion between the palladium coating layer and support, it is preferable that the surface of the porous support be modified using plasma surface treatment before the formation of the palladium coating layer. Specifically, the plasma condition for surface modification may vary with the process and is not particularly limited. For example, in the case of using a porous nickel support, the plasma process may be performed under conditions of RF 100 W, 50 mTorr, with an amount of hydrogen of 40 scam, and for 5 min.

When an electroplating process is used to form the palladium coating layer, it is not particularly limited, and may preferably be performed under conditions of a current density of 10 mA/dm$^2$, a plating time of 20 min, and a plating bath temperature of 40° C. Alternatively, in the case of using a dry sputtering deposition process, this process does not need a particular limitation, and may preferably be carried out under conditions of direct current (DC) power of 40 W, an amount of argon gas of 25 sccm, a process pressure of $1.0 \times 10^{-3}$ torr and a substrate temperature of 400° C.

Subsequently, a metal coating layer is formed on the palladium coating layer. The kind of metal constituting the metal coating layer is not particularly limited, and includes, for example, silver, nickel, copper, ruthenium, or molybdenum. Of these metals, copper is preferably used, because it is economically advantageous and has high resistance to hydrogen sulfide and sulfur compound poisoning for the alloy membrane with palladium.

The metal coating layer may be formed using either a wet electroplating process or a dry sputtering deposition process. In the case where the palladium coating layer is applied using an electroplating process, the metal coating layer may be electroplated through a continuous process, or be formed using sputtering deposition. In addition, in the case where the palladium coating layer is formed using a dry sputtering deposition process, the metal coating layer may be deposited by sputtering through a continuous process, or may be formed using electroplating.

The electroplating procedure of the metal coating layer by a continuous process may be carried out under slightly different conditions, depending on the kind of metal and an process ambience. For example, in the case where copper is used as a metal component, it may be coated using a copper cyanide plating solution under conditions of a current density of 200 mA/dm$^2$, a plating time of 30 sec and a plating bath temperature of 40° C.

In addition, when the metal coating layer is formed using sputtering deposition by a continuous process, copper may be deposited under conditions of DC power of 30 W, an amount of argon gas of 20 scam, a process pressure of $1.0 \times 10^{-3}$ torr, and a substrate temperature of 400° C.

The two-layer metal membrane thus obtained is alloyed by a subsequent reflow process, to form a palladium-metal alloy composite membrane. The reflow process is preferably performed in an in-situ process, and may be carried out through heat treatment at 500~700° C. in a vacuum of 1 mTorr in a hydrogen atmosphere in a vacuum heating furnace. The reflow process results in a uniform composite membrane having a dense alloy structure without defects or fine pores.

In addition, a method of preparing a palladium alloy composite membrane for hydrogen separation, according to a second embodiment of the present invention, is specifically described below.

The method according to the second embodiment is the same as the preparation method of the first embodiment, with the exception of further including a process of forming a metal underlayer (first metal coating layer) on a porous support, before forming a palladium coating layer, to fill the surface pores of the porous support. Preferably, the metal underlayer is a nickel metal layer, which may be formed using electroplating. The electroplating process is preferable to a dry sputtering deposition process, because it enables the surface pores of the porous support to be completely filled and causes the surface to be flat. Further, in order to improve adhesion before the formation of the nickel plating layer, the surface modification of the porous support using plasma is preferably performed. The advantage thereof is the same as mentioned in the first embodiment.

Then, subsequent processes of forming a palladium coating layer and a second metal coating layer (corresponding to the metal coating layer in the first embodiment) are conducted in the same manner as in the first embodiment, and the detailed description thereof is omitted.

Before the formation of the palladium coating layer, the surface of the first metal coating layer is preferably modified using plasma. The plasma treatment conditions are the same as those of the porous support.

Below, the present invention is explained based on an alloy composite membrane for hydrogen separation using a nickel metal layer as a first metal coating layer on a porous nickel support and a copper metal layer as a second metal layer on the palladium coating.

FIG. 4 is a scanning electron micrograph showing the microstructure of the composite membrane according to the first embodiment of the present invention, and FIG. 5 shows the result of XRD analysis of the alloy composite membrane. From the surface microstructure of FIG. 4 and the crystal analysis of FIG. 5, the palladium-copper alloy membrane formed on the porous nickel support can be confirmed to be a uniform separation membrane, which has a dense structure, without defects or fine pores.

FIG. 6 shows the result of thermal stability of the alloy composite membrane according to the second embodiment of the present invention. To observe such thermal stability, a 3 μm thick nickel coating layer, a 4 μm sputtered palladium coating layer, and a 1 μm sputtered copper coating layer are sequentially formed on a porous nickel support and then heat treated at 600° C. higher than an actual usage temperature for 20 days in a nitrogen atmosphere. Such heat treatment corresponds to thermal effect similar to heat treatment at 500° C. for 1 year or longer, assuming that the other diffusion conditions thereof are the same.

FIG. 6 is a scanning electron micrograph showing the surface microstructure of the membrane. As shown in the drawing, the alloy layer is dense, without defects or fine pores, even though heat treatment is performed. As is apparent from the XRD analysis of FIG. 7, through continuous heat treatment, the chemical affinities of palladium, copper and nickel for each other are good, and thus, a stable ternary alloy membrane of palladium-copper-nickel is formed and strongly adheres on the support.

FIG. 8 shows the result of diffusion in metals, in which palladium is diffused into the support. As seen in an EDS concentration distribution of FIG. 9 through heat treatment, the palladium metal is diffused into the porous support, but a great amount of palladium is still present in the coating layer, thus forming a palladium-copper-nickel alloy separation membrane. As can be shown in the cross section of the microstructure of FIG. 8, the alloy membrane is dense, and also, adhesion between Pd alloy membrane and support is excellent to the extent that the boundary between the support and the alloy coating membrane is not observed even using a scanning electron microscope.

From the results of FIGS. 8 and 9, the palladium metal is less diffused into the porous metal support despite the use of the porous metal support, and thus, a great amount of palladium is present in the form of palladium-copper-nickel alloy composite membrane. The structure of the alloy layer is still dense, and the thermal stability of the palladium-copper-nickel alloy composite membrane is excellent, whereby the durability thereof is considered to be improved compared to conventional results.

FIG. 10 is a photograph showing the microstructure of a palladium-copper alloy composite membrane, resulting from reflow heat treatment of a palladium coating layer and a copper coating layer, each of which is formed using electroplating. As shown in this drawing, the alloy membrane is dense and has no fine pores.

FIG. 11 is a photograph showing the microstructure of a palladium-copper alloy composite membrane formed on a porous alumina support using a reflow technique, in which the alloy membrane is confirmed to have a very dense structure without fine pores.

FIG. 12 shows the hydrogen/nitrogen selectivity varying with the usage temperature of the palladium-copper alloy composite membrane of the present invention, when using a gas mixture including hydrogen and nitrogen under 2.2 psi pressure. As shown in the drawing, as the temperature increases, the selectivity increases and then reaches an infinite value at 500° C., thus exhibiting excellent properties.

Compared to the hydrogen/nitrogen selectivity of a palladium-copper alloy separation membrane prepared using a conventional technique shown in Table 1 below, the palladium-copper alloy composite membrane of the present invention is confirmed to have higher hydrogen selectivity.

TABLE 1

|  | ΔP (kPa) | Temperature (K) | Permeability (ml/cm² · min) | Selectivity ($H_2/N_2$) | Thickness (μm) | Gas |
|---|---|---|---|---|---|---|
| Example | 100 | 773 | 9 | ∞ | 3 ± 0.1 | A gas mixture including $H_2$ and $N_2$ |
| 1[1] | 689.5 | 723 | 6.45 | 14 | 27.6 ± 8.5 | Each separated $H_2$ and $N_2$ gas |
| 2[1] | 344.7 | 973 | 47 | 70 | 11.0 ± 1.0 | Each separated $H_2$ and $N_2$ gas |
| 3[1] | 344.7 | 773 | 69.9 | 170 | 11.6 ± 1.0 | Each separated $H_2$ and $N_2$ gas |
| 4[1] | 344.7 | 723 | 24 | 270 | 12.5 ± 1.5 | Each separated $H_2$ and $N_2$ gas |
| 5[1] | 344.7 | 723 | 107 | 1400 | 12 ± 1.0 | Each separated $H_2$ and $N_2$ gas |
| 6[1] | 344.7 | 723 | 88 | 47 | 1.5 ± 0.2 | Each separated $H_2$ and $N_2$ gas |

Note:
[1]Fernando Roa, Douglas Way, Robert L. McCormick, Stephen N. Paglieri "Preparation and characterization of Pd—Cu composite membranes for hydrogen separation" Chemical Engineering Journals. 93 (2003)11-22.

Mode for Invention

A better understanding of the present invention may be obtained in light of the following example which is set forth to illustrate, but is not to be construed to limit the present invention.

Example

A porous nickel support was surface treated using hydrogen plasma. The surface treatment using hydrogen plasma was carried out under conditions of RF power of 100 W, an amount of hydrogen of 40 sccm, a process pressure of 50 mTorr, and a period of time of 5 min. Subsequently, in order to fill the surface pores of the support, a nickel electroplating process was performed on the surface treated support at room temperature and a current density of 1 A/dm² for a plating time of 2 min using a nickel chloride plating solution. After the nickel electroplating process, the support was dried in a vacuum drying oven at 60° C., and then maintained at 200° C. in a vacuum atmosphere of $10^{-3}$ torr for 1 hr to remove dust and impurities from the inside of the support.

The support was further subjected to hydrogen plasma treatment and then palladium electroplating using a palladium chloride solution under conditions of a current density of 10 mA/dm², a plating time of 20 min, and a plating bath temperature of 40° C. Thereafter, a copper electroplating process was coated using a copper cyanide solution by a continuous process, under conditions of a current density of 200 mA/dm², a plating time of 30 sec, and a plating bath temperature of 40° C. After the formation of coating layers, reflow heat treatment was carried out at 700° C. in a vacuum of 1 mTorr in a hydrogen atmosphere for 1 hr, thus alloying a copper layer and a palladium layer.

On the other hand, in the case where a sputtering process was employed as a dry preparation method, instead of the above wet preparation method, all pretreatment processes and the formation process of a nickel coating layer as a first coating layer were the same as in the above wet method, and only the sputtering process was carried out differently, as follows.

For the deposition of palladium, sputtering was carried out under conditions of a DC power of 40 W, an amount of argon gas of 25 sccm, a process pressure of $1.0 \times 10^{-3}$ torr, and a substrate temperature of 400° C., and copper sputtering was continuously deposited under conditions of DC power of 30 W, an amount of argon gas of 20 scam, and a process pressure of $3.0 \times 10^{-3}$ torr and a substrate temperature of 400° C. Subsequently, an in-situ reflow process was performed under heat treatment conditions of a vacuum of 1 mTorr, and a reflow temperature of 700° C. for 1 hr in a hydrogen atmosphere of a vacuum heating furnace, thus obtaining a palladium-copper-nickel alloy composite separation membrane.

INDUSTRIAL APPLICABILITY

As described hereinbefore, the present invention provides a method of preparing a palladium alloy composite membrane for hydrogen separation. According to the method of the present invention, even though palladium is used in a small amount, a hydrogen separation membrane having outstanding hydrogen selectivity and high durability can be prepared. Further, the properties of the hydrogen separation membrane can be improved, regardless of the kind of support.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of preparing a palladium alloy composite membrane for hydrogen separation, comprising:
   (a) modifying a surface of a porous support using a hydrogen plasma surface treatment under a condition of RF 100 W;

(b) forming a first metal coating layer on the modified porous support using a dry sputtering deposition process;

(c) modifying a surface of the first metal coating layer using a hydrogen plasma surface treatment;

(d) forming a palladium coating layer on the modified first metal coating layer using a dry sputtering deposition process;

(e) forming a second metal coating layer on the palladium coating layer formed by the step (d) using a dry sputtering deposition process; and (f) subjecting the second metal coating layer to a reflow process under a hydrogen atmosphere at 500~700° C. to form an alloy layer.

2. The method according to claim 1, wherein the porous support is a porous metal support or a porous ceramic support.

3. The method according to claim 2, wherein the porous metal support is a porous nickel support.

4. The method according to claim 1, wherein the step (b) further comprises heat treating the first metal coating layer formed using the dry sputtering deposition process to remove impurities.

5. The method according to claim 1, wherein the first metal coating layer is formed of at least one metal selected from a group consisting of silver, nickel, copper, ruthenium, and molybdenum.

6. The method according to claim 1, wherein the second metal coating layer is formed of copper.

* * * * *